(12) United States Patent
Kruse et al.

(10) Patent No.: US 7,730,429 B2
(45) Date of Patent: Jun. 1, 2010

(54) GRAPHICAL WORKSPACE FOR IDEA MANAGEMENT

(75) Inventors: Elaine Kruse, Lancashire (GB); Andres Kruse, Lancashire (GB)

(73) Assignee: Spark-Space Ltd., London (GB)

( * ) Notice: Subject to any disclaimer, the term of this patent is extended or adjusted under 35 U.S.C. 154(b) by 518 days.

(21) Appl. No.: 11/004,081

(22) Filed: Dec. 3, 2004

(65) Prior Publication Data

US 2006/0121436 A1 Jun. 8, 2006

(51) Int. Cl.
*G06F 3/048* (2006.01)
(52) U.S. Cl. .................. 715/855; 706/11; 706/55; 706/59; 715/848; 715/850
(58) Field of Classification Search ........... 715/964, 715/848, 850, 782, 757, 855; 345/649; 706/11, 706/59
See application file for complete search history.

(56) References Cited

U.S. PATENT DOCUMENTS

| | | | | |
|---|---|---|---|---|
| 4,656,603 | A * | 4/1987 | Dunn ..................... | 715/835 |
| 4,752,889 | A * | 6/1988 | Rappaport et al. ........... | 706/11 |
| 4,764,867 | A * | 8/1988 | Hess ..................... | 715/853 |
| 4,815,005 | A * | 3/1989 | Oyanagi et al. ............ | 706/55 |
| 4,822,283 | A * | 4/1989 | Roberts .................. | 434/171 |
| 4,891,766 | A * | 1/1990 | Derr et al. ................ | 706/60 |
| 5,267,332 | A * | 11/1993 | Walch et al. .............. | 382/198 |
| 5,506,937 | A * | 4/1996 | Ford et al. ............... | 706/11 |
| 5,546,529 | A * | 8/1996 | Bowers et al. ............. | 715/848 |
| 5,555,354 | A * | 9/1996 | Strasnick et al. ........... | 345/427 |
| 5,596,703 | A * | 1/1997 | Eick et al. ............... | 715/700 |
| 5,621,865 | A * | 4/1997 | Iwamoto et al. ........... | 345/419 |
| 5,673,369 | A * | 9/1997 | Kim ..................... | 706/59 |
| 5,729,704 | A * | 3/1998 | Stone et al. .............. | 715/804 |
| 5,812,134 | A * | 9/1998 | Pooser et al. ............. | 715/848 |
| 5,815,161 | A * | 9/1998 | Emmerink et al. .......... | 345/440 |
| 5,835,085 | A * | 11/1998 | Eick et al. ............... | 715/853 |
| 5,978,804 | A * | 11/1999 | Dietzman ................ | 707/10 |
| 6,005,482 | A * | 12/1999 | Moran et al. ............. | 340/568.8 |
| 6,029,172 | A * | 2/2000 | Jorna et al. .............. | 707/102 |
| 6,037,944 | A * | 3/2000 | Hugh .................... | 715/854 |
| 6,137,499 | A * | 10/2000 | Tesler ................... | 345/440 |
| 6,144,962 | A * | 11/2000 | Weinberg et al. ........... | 707/10 |
| 6,256,032 | B1 * | 7/2001 | Hugh .................... | 715/854 |
| 6,262,737 | B1 * | 7/2001 | Li et al. .................. | 345/419 |
| 6,373,484 | B1 * | 4/2002 | Orell et al. .............. | 345/420 |
| 6,421,066 | B1 * | 7/2002 | Sivan ................... | 715/712 |
| 6,426,745 | B1 * | 7/2002 | Isaacs et al. .............. | 345/419 |
| 6,446,061 | B1 * | 9/2002 | Doerre et al. ............. | 707/3 |
| 6,556,225 | B1 * | 4/2003 | MacPhail ................ | 715/848 |
| 6,775,659 | B2 * | 8/2004 | Clifton-Bligh ............ | 707/1 |
| 6,778,970 | B2 * | 8/2004 | Au ....................... | 706/55 |
| 6,907,417 | B2 * | 6/2005 | Alpert ................... | 706/55 |

(Continued)

*Primary Examiner*—Ba Huynh
*Assistant Examiner*—Eric Wiener
(74) *Attorney, Agent, or Firm*—Schwegman, Lundberg & Woessner, P.A.

(57) ABSTRACT

This document discusses, among other things, a computer software program that implements a graphical workspace for idea management. This includes a graphical user interface (GUI) with an idea map window and a word processor document window. The idea map represents ideas as a hierarchical network of nodes and links. An interface automatically updates the word processor document using sequencing information from the hierarchical network. A routine automatically arranges nodes in the 2D representation. Another routine automatically generates virtual 3D representations of the idea map.

27 Claims, 8 Drawing Sheets

U.S. PATENT DOCUMENTS

| | | | |
|---|---|---|---|
| 6,931,604 B2 * | 8/2005 | Lane | 715/853 |
| 6,985,898 B1 * | 1/2006 | Ripley et al. | 707/5 |
| 7,120,619 B2 * | 10/2006 | Drucker et al. | 706/45 |
| 7,120,646 B2 * | 10/2006 | Streepy, Jr. | 707/104.1 |
| 7,143,100 B2 * | 11/2006 | Carlson et al. | 707/101 |
| 7,181,438 B1 * | 2/2007 | Szabo | 707/2 |
| 7,292,243 B1 * | 11/2007 | Burke | 345/440 |
| 7,363,583 B1 * | 4/2008 | Costa | 715/734 |
| 2002/0147627 A1 * | 10/2002 | Roosevelt et al. | 705/10 |
| 2003/0132932 A1 * | 7/2003 | Yang | 345/418 |
| 2005/0234957 A1 * | 10/2005 | Olson et al. | 707/101 |
| 2005/0262081 A1 * | 11/2005 | Newman | 707/9 |
| 2006/0095474 A1 * | 5/2006 | Mitra et al. | 707/104.1 |
| 2006/0106793 A1 * | 5/2006 | Liang | 707/5 |
| 2006/0106847 A1 * | 5/2006 | Eckardt et al. | 707/101 |

\* cited by examiner

GRAPHICAL WORKSPACE FOR IDEA MANAGEMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2004, Spark-Space, Ltd. (a United Kingdom Registered Company) All Rights Reserved.

TECHNICAL FIELD

This patent document pertains generally to computer software and more particularly, but not by way of limitation, to a graphical workspace for idea management.

BACKGROUND

Anybody who has ever written an essay (or the like) has grappled with the task of organizing various abstract ideas into a coherent linear written document. Along with style and content, the organization of a written document typically determines its effectiveness. The difficulty of this task may vary, even between people of similar intelligence, because of innate differences in how people think or view the world.

For example, spatial and sequential thinking are two different mental organizations that affect the way people view the world. Sequential thinking can be conceptualized as step-by-step linear thinking over time. By contrast, spatial thinking can be conceptualized as an holistic system in which all knowledge is interconnected in space. Auditory thinking is typically associated with sequential thinking and visual thinking is typically associated with spatial thinking. Historically, most teaching methods, presentation styles, and productivity tools have been developed for those people who are best suited to think and receive information in a sequential manner. However, dyslexics and others are believed to be typically better suited for receiving or compiling information spatially instead of sequentially. Moreover, such spatial thinkers are believed to constitute some of the most creative and entrepreneurial individuals in society. The present inventors have recognized that spatial thinkers can benefit from more effective tools that service their spatial thinking style and that interrelate their spatial thinking style with sequential documents. The present inventors have also recognized that sequential thinkers can also benefit from such tools—although creating well-organized linear documents may be easy for such individuals, they may still find it difficult to see the "big picture."

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Overview

Figure 1:
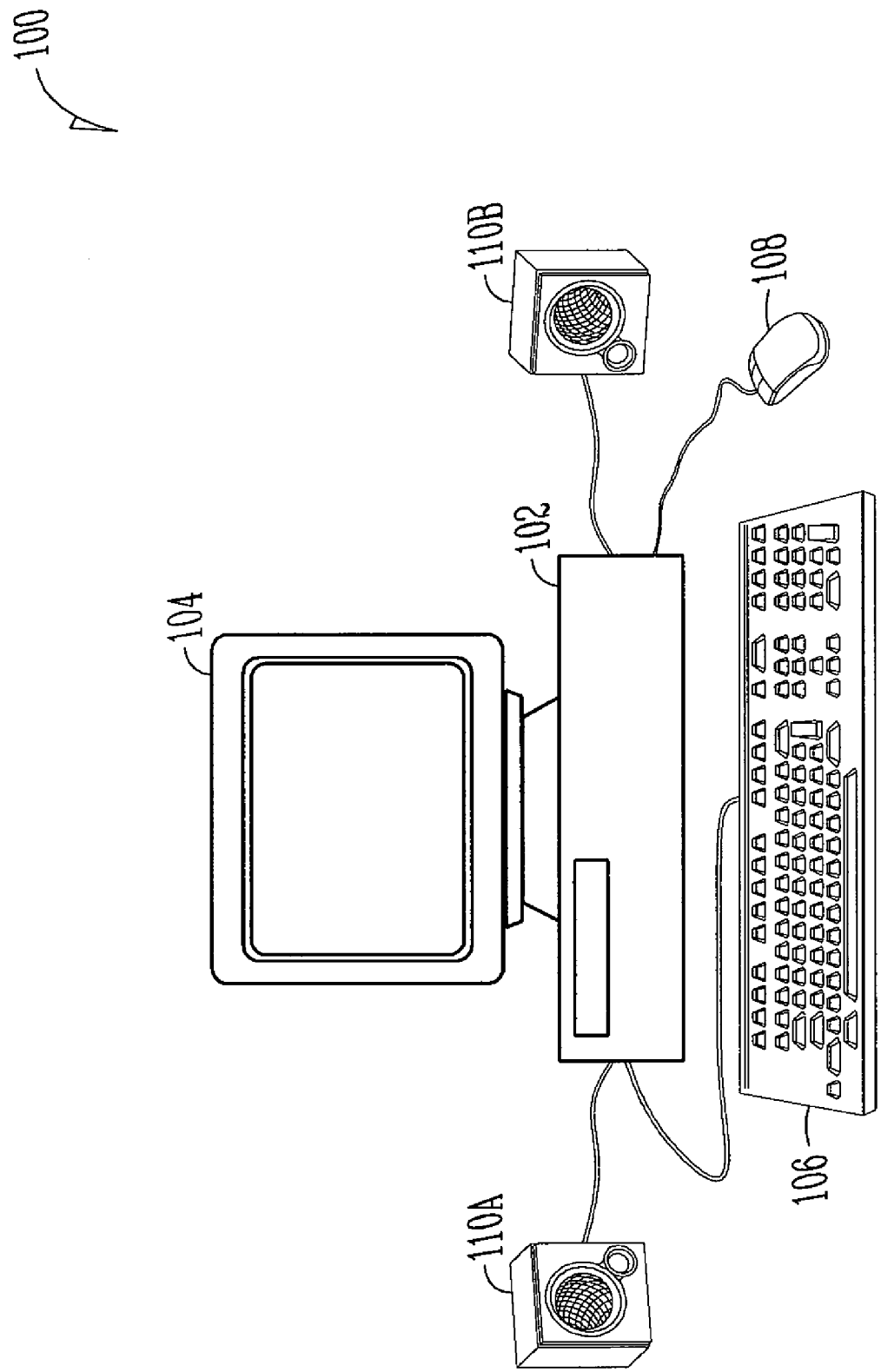
FIG. 1 is a schematic drawing illustrating generally one example of a computer or other system running software that, among other things, implements a graphical workspace for idea management and other uses.

FIG. 1 is a schematic drawing illustrating generally one example of a computer or other system 100 running software that, among other things, implements a graphical workspace for idea management. In the example of FIG. 1, the system 100 includes a personal computer system 100 (e.g., including electronics unit 102, display monitor 104, keyboard 106, mouse, 108 or speaker(s) 110). However, the system 100 could include any desktop, laptop, handheld (e.g., personal digital assistant (PDA)), or other computing or communications device (e.g., mobile phone). The present graphical workspace for idea management can be implemented on a standalone device (e.g., on a personal computer using Microsoft Windows, Apple OS, Linux or another operating system), in a client-server environment (e.g., using a web browser), or any other manner.

Figure 2:
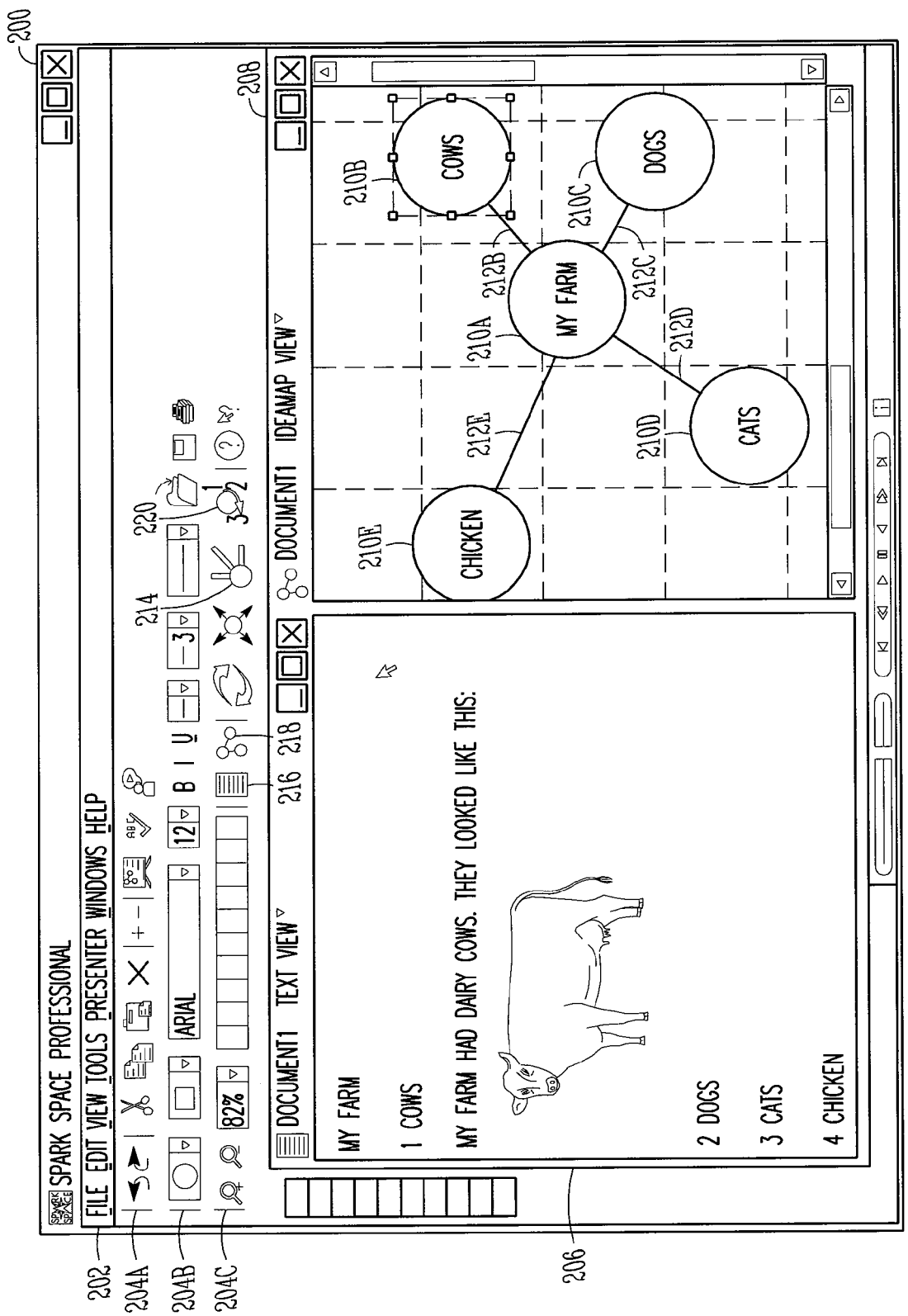
FIG. 2 is a computer monitor display screenshot illustrating generally one example of a computer monitor screen display or other graphical user interface (GUI) including the graphical workspace for idea management.

FIG. 2 is a screenshot illustrating generally one example of a computer monitor screen display or other graphical user interface (GUI) including the graphical workspace for idea management. In this example, the GUI includes a Windows-style display window 200 with menus 202 and toolbars 204, such as at the top of the display window 200. In this particular example, the display window 200 includes two sub-windows: (1) word processor document window 206 and (2) "idea map" window 208. The word processor document window 206 is also referred to as a "text view," although, like other typical word processor documents, it can also incorporate non-textual information, such as graphical or audiovisual images, etc., such as shown in FIG. 2. The "idea map" window 208 provides a graphical workspace for idea management, which can be displayed concurrently with the word processor document window 206. However, the word processor document window 206 and the idea map window 208 need not be displayed concurrently. For example, each or both of these windows can be "maximized," "minimized", or "hidden" as is common for such GUI windows. In one example, the word processor document window 206 is implemented as an integrated application program interface (API) to a Microsoft WORD document, to an Apple WORKS word processor document, or to another commonly used third party word processor document. In another example, the word processor document window 206 invokes an integrated word processor application program that allows the user to edit text, change fonts, or otherwise alter the look and feel of the document, and to save such changes in a hypertext markup language (HTML) file or rich text format (RTF) file that is readable by a commercial word processor program, such as Microsoft WORD or the Apple WORKS word processor program. This avoids the need to export information from the software program providing the graphical workspace for idea management to a separate commercial word processor program for performing such editing to alter the look and feel of the document.

A user with a spatial thinking preference can capture and organize ideas graphically using the idea map 208. Then, such graphically-created or organized ideas are automatically converted into a textual outline or other sequential representation in the word processor document window 206. In this manner, the word processor document window 206 and the idea map window 208 are able to provide different representations of the same project.

In one example, the idea map window 208 is used to represent ideas in a network, such as a hierarchical network. One example of the hierarchical network can be conceptualized as including nodes, representing ideas, and links between such nodes, representing relationships between the ideas. In this example of the hierarchical network, one particular node forms the "root" node to which a number of other nodes are connected via links. These other nodes may, in turn, be connected to other nodes using such links. In a hierarchical network, there is typically only one link from one node to another node. Some other examples of analogous hierarchical networks include: (1) a computer file system, in which a node is a directory, and a link represents the containment of a subdirectory in a directory; (2) inheritance relationships, in which a node represents a person, and a link represents a parent-child relationship; (3) an idea or concept map, in which a node contains textual information (e.g., representing an idea or concept) and the link signifies containment; and (4) database index trees.

In the example of FIG. 2, the idea map uses a hierarchical network that includes a graphical two-dimensional representation in which an idea or other concept node is represented by a single labeled graphical object (e.g., a circle, square, rectangle, polygon, etc.) and the link between nodes is represented by a linking object (e.g., a line, polygon, curve, arrow, etc.). For example, in the idea map window of FIG. 2, the root node circle labeled "my farm" is linked to child nodes 210B-E ("cows", "dogs," "cats," "chicken") via respective line links 212B-E.

To create the idea map of FIG. 2, the user would typically start with a empty idea map, which can be displayed as a blank sheet. In the example of FIG. 2, the blank sheet includes a light (e.g., dashed-line) grid to guide the user's eyes. In one example, the user points a mouse cursor to a desired location on the map and clicks on that location by depressing a button on the mouse. This allows the user to begin typing at that location to create a node label representing a particular idea or concept. The user then points the mouse cursor to a different location and clicks on that location to create another node representing another idea. This process continues to create various nodes, as needed. The nodes can be moved by selecting, dragging, and dropping a node using the mouse cursor.

To link nodes, in one example, the user clicks the mouse cursor on a "Create Links" toggle button 214 on the toolbar 204C. This invokes a "Link Creation" mode. Then, the user clicks on a first idea node to be linked (e.g., "my farm" 210A) using the mouse cursor. Then, the user successively clicks on any other ideas (e.g., "cows" 210B, "dogs," 210C, "cats," 210D, and "chicken" 210E) that the user wants to link to the first idea node. To turn off the "Link Creation" mode, the user again clicks on the first idea node (e.g., "my farm" 210A) or, alternatively, again clicks on the "Create Links" toggle button 214. This exits the "Link Creation" mode.

After the idea map (or a desired portion thereof) has been created, the user can then bring up the word processor document window 206 by using the mouse cursor to click on the "Text View" button 216 on the toolbar 204C. This results in the display, in the word processor document window 206, of an outline of the idea node labels from the idea map, along with any other text or figures that were previously attached to the idea node. The idea map 208 can then be viewed again by using the mouse cursor to click on the "Idea Map" button 218 on the toolbar 204C. Both the idea map window 208 and the word processor document window 206 can be displayed concurrently (as illustrated in FIG. 2) by selecting a "Tile Vertical" option under the "Windows" menu of the user interface window.

Figure 3:
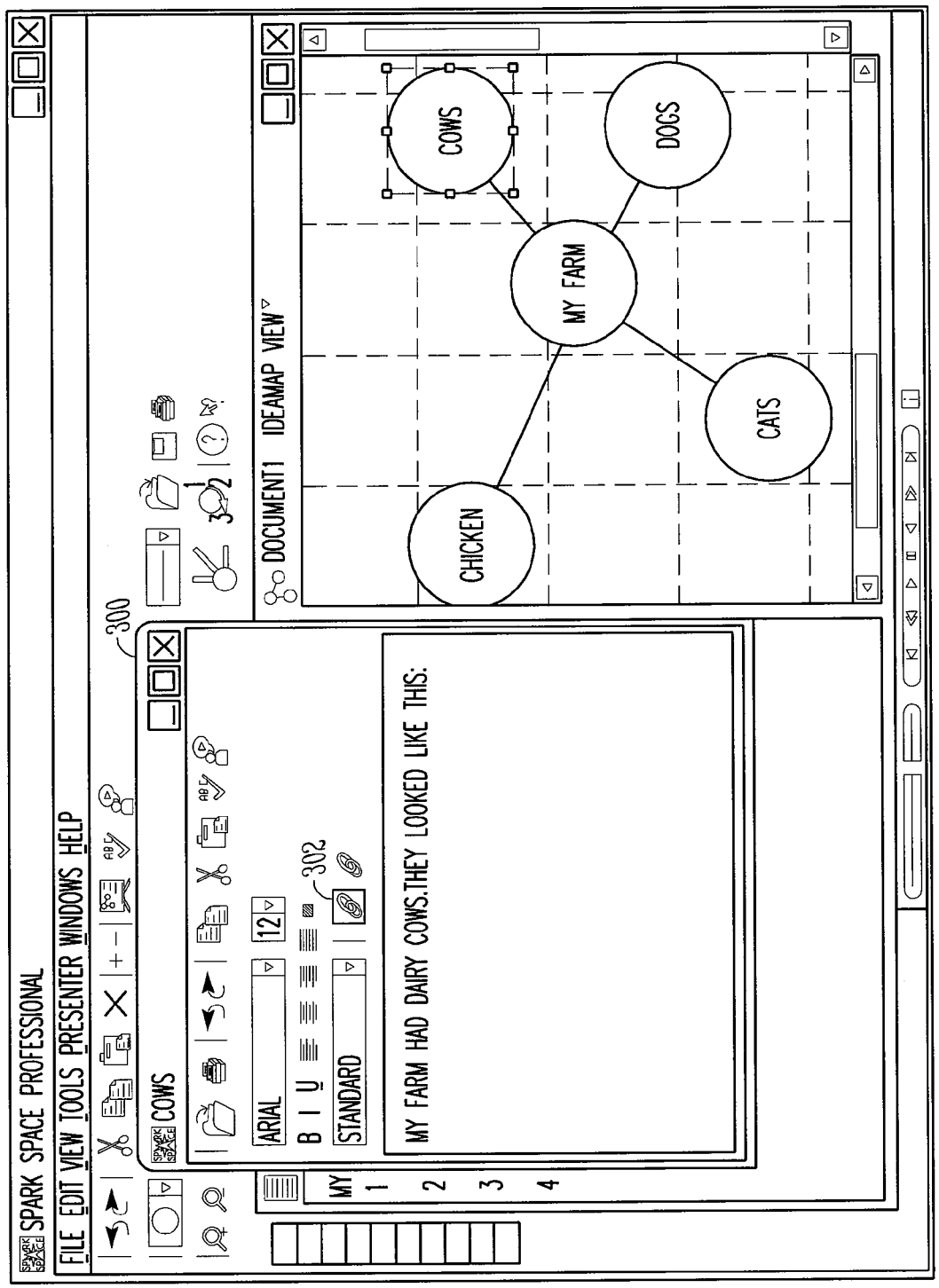
FIG. 3 illustrates a text editor window that, in one example, is invoked by double-clicking a mouse cursor on a node.

To attach additional text to a particular idea node, the user double clicks on the desired idea node using the mouse cursor. This invokes a text editor window 300, as illustrated in the example screenshot of FIG. 3. The user can then enter and format text in the text editor window 300; such text will be attached to the selected idea node when the text editor window 300 is closed. The user can also attach an image to the idea node. In one example, this is accomplished by using the mouse cursor to click on a "Link to Image" button 302. This invokes a browser window that allows the user to browse through a file directory or a local or remote image library to find the desired image to be attached to that idea node. Any such attached images are automatically displayed in the word processor document window 206 along with the attached text (if any) that is associated with a particular idea node. In this manner, the word processor document window 206 is automatically updated as a result of editing work performed by the user using the idea map window 208. For example, FIG. 2 illustrates an example in which the word processor document window 206 was automatically updated to include the text "my farm had dairy cows. they looked like this:" and the graphical display of a spotted black-and-white cow, where this additional text and image was updated using the idea map by selecting the "cows" idea node 210B, as discussed above.

Figure 4:
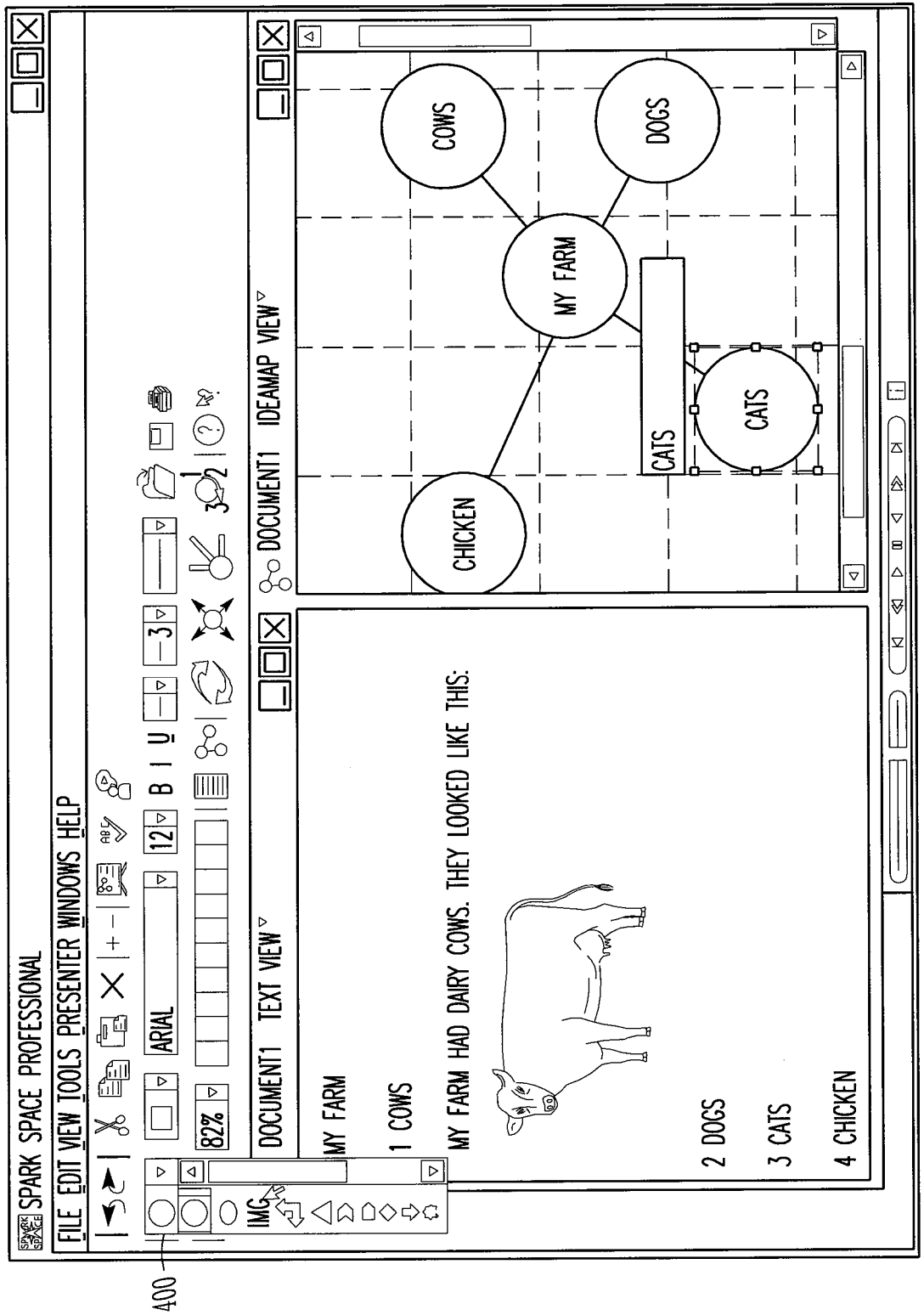
FIG. 4. illustrates a drop down menu that allows a user to change the node shape, including to an image.

Images can also be inserted into the idea map window 208. In one such example, the image is inserted into the idea map window 208 to represent an idea node. For example, the circle-shaped "cats" node 210D in FIG. 2 can be changed into a cat-shaped icon as follows. First, the user selects the circle-shaped "cats" node 210D in FIG. 2 using the mouse cursor. Then the user selects an "IMG" (i.e., image) option from a drop-down menu 400 that allows the node shape to be changed from a circle to another shape or to an imported image file, as illustrated in FIG. 4. Selecting the "IMG" option in the drop-down menu 400 invokes a browser window that allows the user to browse through a file directory or a local or remote clip-art or other image library to find the desired image to be used in the image map as a graphical representation of the selected idea node.

Translating Between Idea Map and the Sequential Linear Document

In one example, translating between the idea map created in the idea map window 208 of FIG. 2 and the sequential and linear outline in the word processor document window 206 of FIG. 2, involves assigning a clockwise sequence to all child nodes of a particular parent node. For example, this clockwise sequencing can be conceptualized as beginning with the root node, at a ray extending out in the "12 o'clock" direction from the root node and, proceeding in a clockwise direction around the root node to assign (in sequence) an integer index value to each encountered link to a direct child node. Then, taking each child node in order, a subindex value is assigned to each encountered link to a grandchild node by proceeding in a clockwise direction from the link between that child node and the parent (in this case the root) node. This hierarchical sequencing process is continued recursively until each node is assigned an index value.

Figure 5:
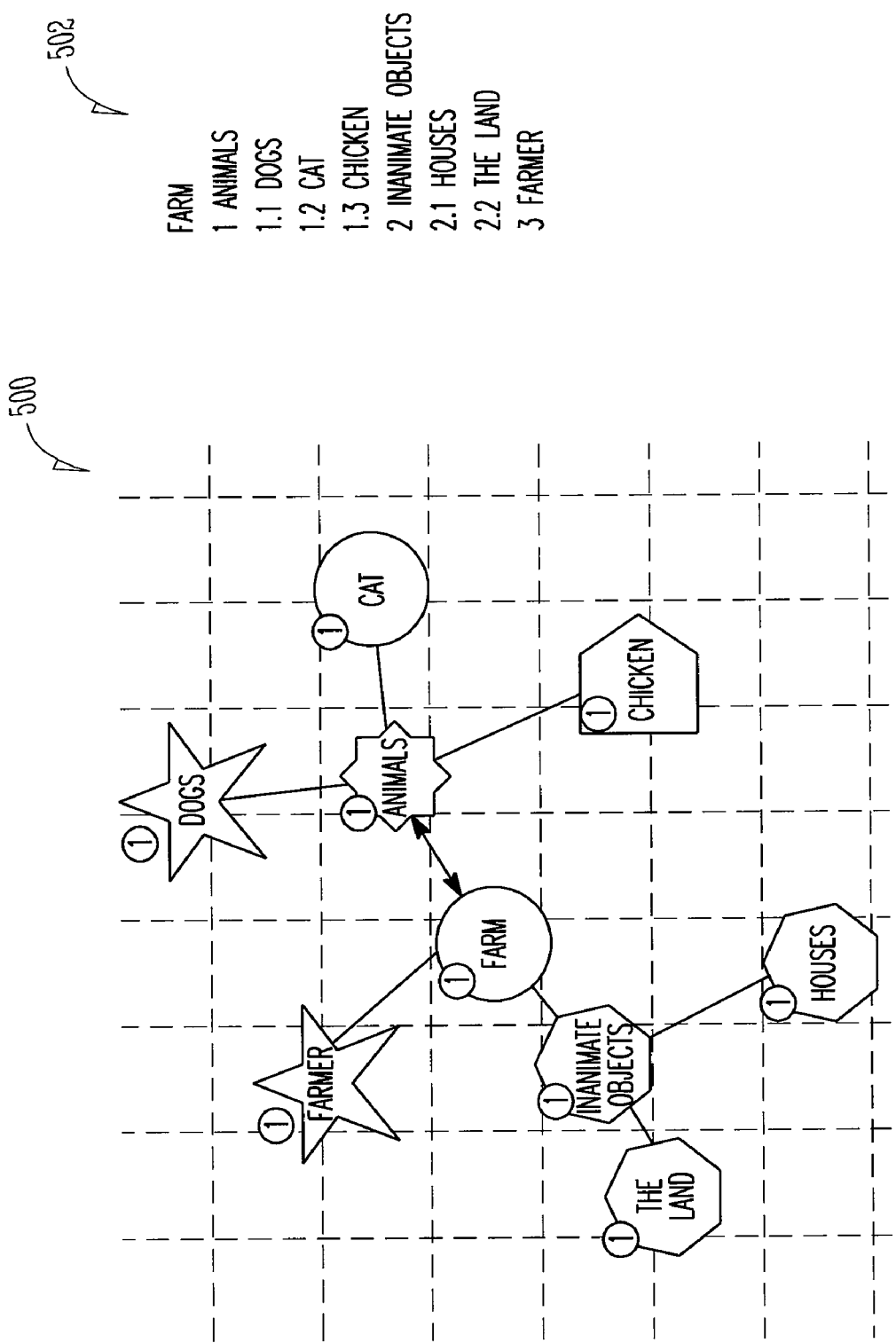
FIG. 5 is a schematic drawing of one illustrative example of an idea map and a corresponding textual ordering using a clockwise sequencing convention.

For example, the index value "3.2.1" corresponds to a node that is located by beginning at the root node ("Node A"), finding the third child node ("Node B") of Node A (proceeding in a clockwise direction from the 12 o'clock from Node A), then taking the second child ("Node C") of Node B (proceeding in a clockwise direction from the link between Nodes B and A), and then taking the first child ("Node D") of Node C (proceeding in a clockwise direction from the link between nodes C and B). FIG. 5 is a schematic drawing of one illustrative example of an idea map 500 and a corresponding textual ordering 502 using the above clockwise sequencing convention. Although the above example uses a clockwise sequencing convention, a counter-clockwise sequencing convention could be used instead.

Updating Between Idea Map and Linear Document

In one example, the user can change the order of entries in the outline in the word processor document window 206 by moving one or more of the nodes in the idea map 208, such as by dragging and dropping such nodes using the mouse cursor. After moving the nodes about in the idea map as desired, a new sequencing translating the idea map into the outline is obtained by using the mouse cursor to click on a "Renumber Ideas" button 220. This automatically updates the ordering of the text (or other information) in the word processor document window 206.

In an alternative example, no "Renumber Ideas" button 220 is required. Instead, in this example, the sequencing of the text or other information in the outline in the word processor document 206 is automatically updated "live" in real-time as the nodes in the idea map window 208 are being manipulated by the user. Therefore, in this example, the sequencing of the text or other information in the outline in the word processor document 206 is always consistent with the arrangement of the nodes of the idea map in the idea map window 208.

In another example, in which the user interface displays both the word processor document window 206 and the idea map window 208, when a particular node is selected by the user in the idea map, the corresponding text in the word processor document window 206 is automatically scrolled to, brought to the middle of the word processor document window 206, or otherwise located or emphasized for the user's convenience.

In yet another example, in which the user interface displays both the word processor document window 206 and the idea map window 208, when text or other information associated with a particular node is selected by the user in the word processor document window 206, the corresponding node in the idea map is automatically located, brought to the middle of the idea map window 208, or otherwise located or emphasized for the user's convenience.

Automatic Arrangement of Two-Dimensional Idea Map

In one example, the graphical workspace for idea management includes a software method of automatically arranging a two-dimensional (2D) representation of a network of nodes and links, such as the idea maps illustrated in FIGS. 2 and 5, for example. This can be conceptualized and referred to as a "force minimization method" because of analogous principles in physics, however, the reader should understand that use of such terms and principles for physics is merely intended to assist in conceptualizing the algorithm, and is not intended to actually incorporate or use such physical parameters.

Figure 6:
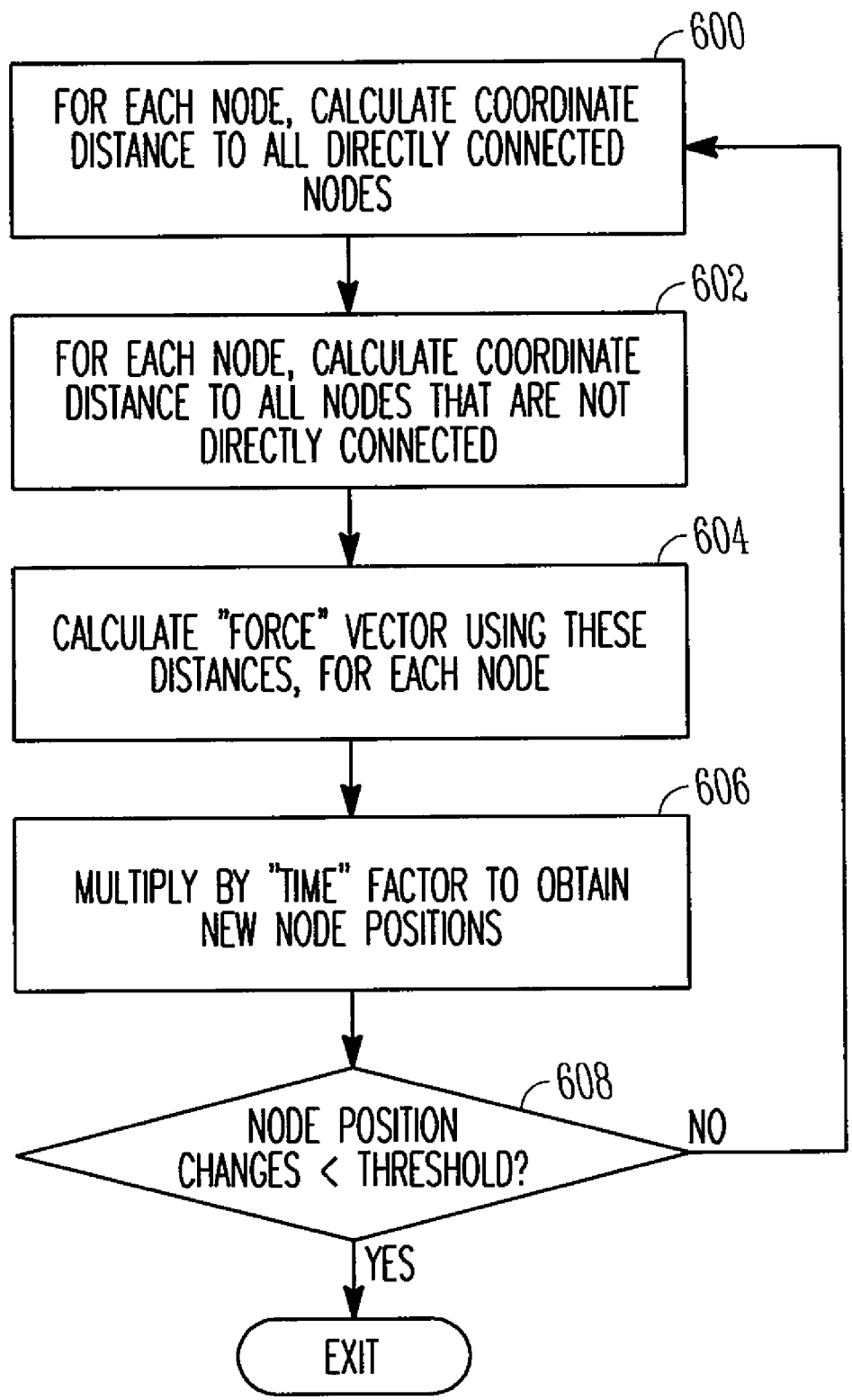
FIG. 6 is a flow chart illustrating conceptually one example of an automatic arrangement algorithm.

FIG. 6 is a flow chart illustrating conceptually one example of this automatic arrangement algorithm. The computer-implemented algorithm is applied to all nodes of a 2D graphical representation of a network with 'n' nodes. At 600, for a given node 'i' the distance in the 2D coordinates $(x_{ij}, y_{ij})$ of all nodes 'j' that are directly connected by a link to this node 'i' are calculated. Then, at 602, the distances in the two dimensional coordinates $(x_{ik}, y_{ik})$ of node 'i' to all nodes 'k' that are not directly connected via a link are calculated. Then, at 604, from these distances a 2D 'velocity' vector $(X_i, Y_i)$ for node 'i' is determined using the equations given below:

$$X_i = r \sum_j \frac{x_{ij}}{(x_{ij}^2 + y_{ij}^2)^R} - a \sum_k \frac{x_{ij}}{[D - (x_{ik}^2 + y_{ik}^2)]^A}$$

$$Y_i = r \sum_j \frac{y_{ij}}{(x_{ij}^2 + y_{ij}^2)^R} - a \sum_k \frac{y_{ij}}{[D - (x_{ik}^2 + y_{ik}^2)]^A}$$

where $R \geq 1.5$, $A \geq 2$, 'r' and 'a' give the "strength" of the "repulsive" and "attractive" force respectively, and 'D' is a dimensional parameters that determines the final distance of the nodes. The actual parameters are chosen by the user, and in one illustrative example, r=2000.0 and a=1500.0 and R=1.5, A=2.0, D=125.0. This "velocity" vector is calculated for all nodes and multiplied with a "time" factor, at 606, to calculate the new position of the nodes. The 'time' factor is 1.0 at the beginning of the minimization. For each step, the factor is chosen such that the new position of the nodes is not too far away from the previous position (in one example the maximum allowed distance is 10.0. Only then will the node position be updated with the new position. This entire procedure is repeated until, at 608, the actual changes to the node positions become very small or until the user stops the algorithm. The idea map is redisplayed using the new node positions at regular real time intervals to the user. This result avoids overlapping display of nodes and otherwise provides a better spatial arrangement of the displayed nodes. This, in turn, enhances the usefulness of the idea map for spatial thinkers.

The above example provides an example in which the hierarchical network is displayed as radiating (star-like) outward from the root node. However, in another example, the above equations are modified to result in a tree-root/branch-like display, for example, extending downward and outward from the root node. An additional term is added to the formula for the $Y_i$ component of the 'velocity' vector: $c(y_i - y_c - Cl_i)^3$, where '$y_i$' is the 'y' coordinate of the node; '$y_c$' the 'y' coordinate of the root node; '$l_i$' the level at which node 'i' is, in other words the number of nodes between this node and the root node, plus 1; 'C' is a dimensional parameter giving the final distance of the levels; 'c' is a parameter giving the strength of this 'force'. In an illustrative example, $c=0.1$, $C=125.0$.

Projection of 2D Idea Map into 3D Representation on 2D Display

The 2D idea map of FIGS. 2 and 5 provide a valuable visual aid to spatial thinkers for formulating and organizing ideas, as well as to sequential thinkers in visualizing the "big picture." In one example, the present system also provides another valuable spatial idea map representation, that is, a projection of the 2D idea map into a three-dimensional (3D) representation that can be displayed on a 2D display, such as a computer monitor screen, a printout, etc. As explained below, in one example, this includes a software method of rotating the structure of a 2D model of a hierarchical network comprising nodes and links around any axis (or multiple axes) and displaying and editing this rotated virtual 3D projection on a 2D device such as a computer screen.

Figure 7:
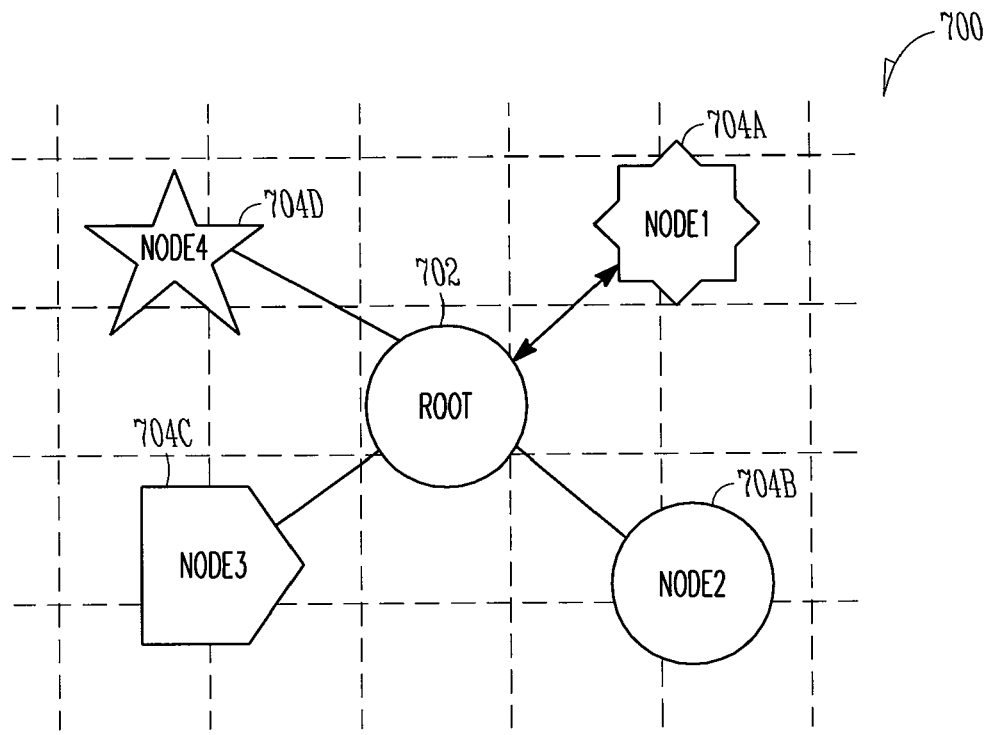
FIG. 7 is a schematic drawing of a two-dimensional (2D) representation of an idea map.

FIG. 7 is a schematic drawing of a 2D representation of an idea map 700, such as for display in the idea map window 208 of FIG. 2. In the example of FIG. 7, the idea map 700 includes a root node 702, and four child nodes 704A-D linked thereto. In this example, the idea map is superimposed upon a grid of dashed lines that guides the user's eyes.

Figure 8:
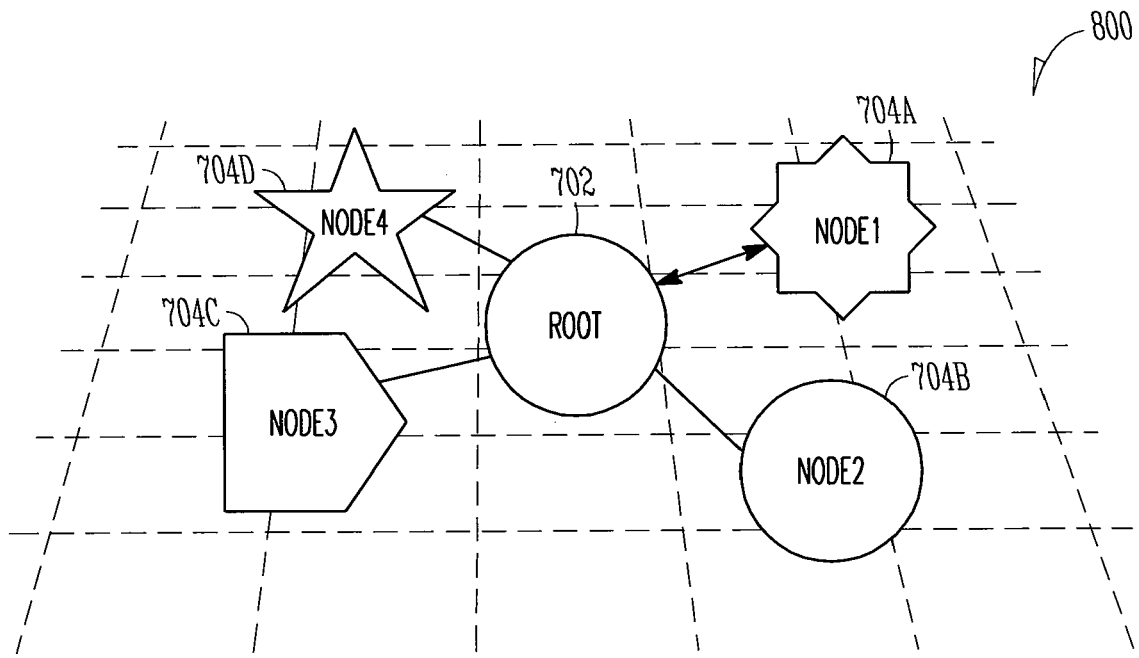
FIG. 8 is a schematic drawing of a virtual 3D representation of the idea map of FIG. 7, which can be projected onto the 2D surface of a computer monitor screen.

FIG. 8 is a schematic drawing of a virtual 3D representation 800 of the idea map 700, which can be projected onto the 2D surface of a computer monitor screen. In one example, the virtual 3D representation 800 is created by assuming that two axes create the dimensions of the representation itself. In one example, the virtual 3D representation 800 is created by rotating the 2D idea map 700 about a third axis of the representation that is not coplanar to the first two axes. In another example, multiple arbitrary rotation axes are defined for creating a rotated projection of this 3D representation on a 2D screen.

In the example of FIG. 8, the virtual 3D representation 800 is created by rotating the 2D idea map of FIG. 7 around a horizontal axis through the root node 702. This sends the nodes 704A and 704D into the background of the projected virtual 3D representation 800, and brings nodes 704C and 704D into the foreground of the virtual 3D representation 800. Accordingly, the graphical object shapes and label text of nodes 704A and 704D are made smaller and the graphical object shapes and label text of nodes 704B and 704C are made larger as a result of the rotation. However, it should be noted that neither the graphical object shapes representing the nodes nor the node labels have been rotated. Instead, the graphical objects representing the nodes and the node label text only change their position and size according to the rotated projection. The dashed line grid is also modified to illustrate the rotated projection's perspective. The dashed line grid is only one example of a perspective indication indicating the viewer's "perspective" in the virtual 3D representation 800. The right angles of the grid in the 2D representation 700 are modified in the virtual 3D representation 800 to provide the viewer with an easily discernable indication of the spatial relationship between the 2D representation 700 and the 3D representation 800.

Figure 9:
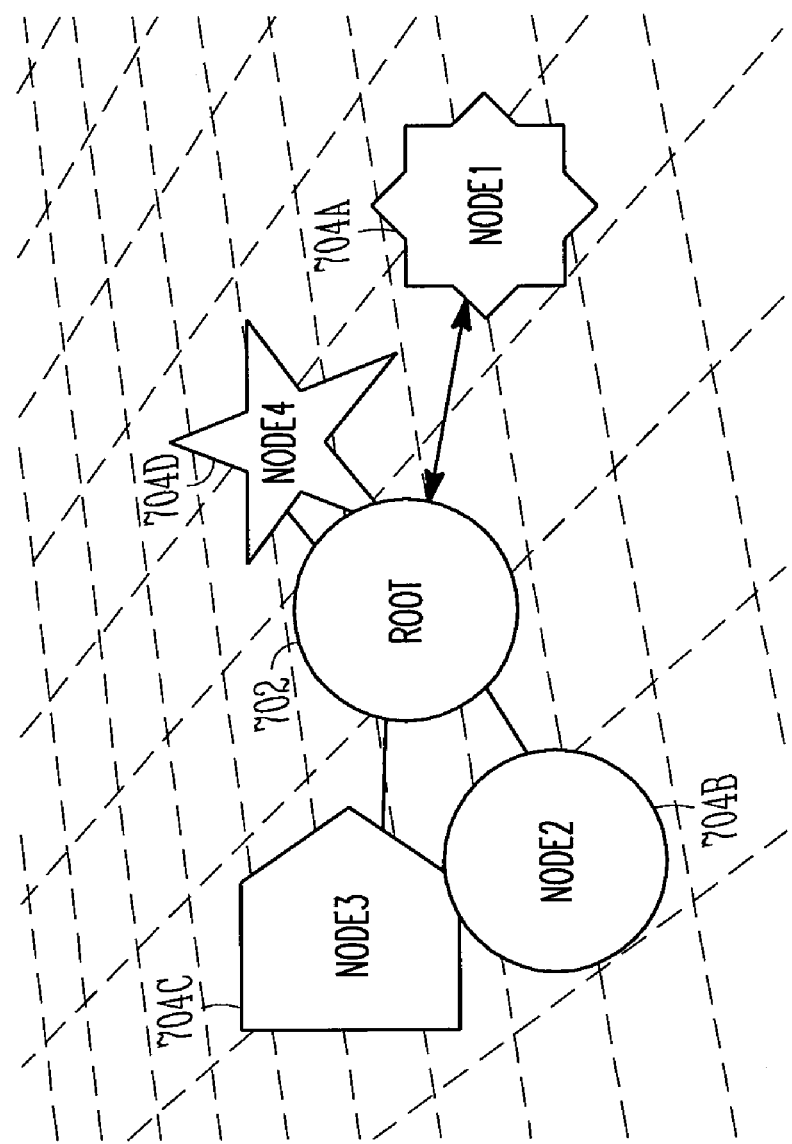
FIG. 9 is a schematic drawing of a virtual 3D representation that is created by further rotating the virtual 3D representation of FIG. 8 around a vertical axis through the root node.

In the example of FIG. 9, the virtual 3D representation 900 is created by further rotating the virtual 3D representation 800 of FIG. 8 around a vertical axis through the root node 702. Again, graphical object shapes representing nodes are made smaller for those nodes located in the background region of the projection, and made larger for those nodes located in the foreground region of the projection. The dashed line grid has also again been modified to illustrate the rotated projection's perspective. The 3D projections of FIGS. 8 and 9 are particularly valuable for spatial thinkers to visualize representations of their ideas from various spatial perspectives. Displaying such a 3D projection is not only valuable for helping spatial thinker to visualize a strictly hierarchical network, the present systems, devices, and methods are also useful to helping such spatial thinkers view and visualize other kinds of displayed charts (e.g., flow charts, bubble charts, organizational charts, etc.)

CONCLUSION

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Certain aspects of the present methods can be performed using instructions stored on a tangible machine-readable medium.

What is claimed is:

1. A machine-assisted method comprising:
providing a graphical user interface (GUI) including an idea map window for displaying and editing a graphical representation of a hierarchical network of graphical nodes, the nodes graphically representing ideas, and graphical links between ones of the nodes, the links graphically representing relationships between the ideas, a particular node being capable of being associated with corresponding text and an associated image;
providing a word processor document window for displaying textual and image information, associated with respective nodes of the hierarchical network, in a word processor document;
automatically organizing the displayed textual information for the user into a textual sequence displayed in the word processor document window, wherein an image associated with the particular node is displayed in the word processor window together with text associated with the particular node; and
obtaining the textual sequence by automatically hierarchically processing the graphical representation of the hierarchical network of graphical nodes displayed in the idea map window, including, beginning with a graphically displayed root node, automatically hierarchically processing for a particular graphically displayed node any graphically displayed linked children nodes according to an ordering convention that uses only one of a clockwise manner or an anticlockwise manner as the linked children nodes are graphically displayed about their respective graphically displayed parent nodes in the hierarchical network of graphical nodes displayed in the idea map window, then proceeding to similarly automatically hierarchically process any linked children nodes according to the same ordering convention;
concurrently displaying the idea map window and the word processor document window; and
automatically updating the word processing document window with information from any changes in the idea map window, including automatically updating the text and image in the word processing window live, in real time, as the corresponding graphical nodes in the idea map window are being manipulated by the user.

2. The method of claim 1, in which the graphical representation is a two-dimensional (2D) graphical representation.

3. The method of claim 1, in which the graphical representation is a virtual three-dimensional (3D) graphical representation projected onto a 2D computer screen.

4. The method of claim 3, further comprising rotating a 2D graphical representation around at least one axis to obtain the virtual 3D graphical representation.

5. The method of claim 1, further comprising automatically arranging the graphical representation of a hierarchical network of nodes, in which the automatically arranging comprises iteratively:
determining, for each node, a first coordinate distance to each directly connected node;
determining, for each node, a second coordinate distance to each node that is not directly connected; and
determining, using the first and second coordinate distances, new positions for the nodes.

6. A computerized system comprising:
a graphical user interface (GUI), the GUI comprising:
an idea map window configured for displaying and editing a graphical representation of a hierarchical network of graphical nodes, the nodes graphically representing ideas, and graphical links between ones of the nodes, the links graphically representing relationships between the ideas, a particular node being capable of being associated with corresponding text and an associated image;
a word processor document window configured for displaying textual information, associated with respective nodes of the hierarchical network, in a word processor document; and
an interface between the idea map window and the word processor document window, the interface automatically organizing textual information associated with respective nodes of the hierarchical network for the user into a textual sequence displayed in the word processor document window, wherein an image associated with the particular node is displayed in the word processor window together with text associated with the particular node, the interface configured to obtain the textual sequence by automatically hierarchically processing the graphical representation of the hierarchical network of graphical nodes displayed in the idea map window, beginning with a graphically displayed root node, the hierarchically processing including automatically locating and hierarchically processing any displayed linked children nodes according to an ordering convention that uses only one of a clockwise or an anticlockwise manner as the linked children nodes are graphically displayed about their respective parent nodes in the hierarchical network and then proceeding to automatically hierarchically process any linked children nodes according to the same ordering convention to automatically obtain from the hierarchical network of nodes the textual sequence displayed in the word processor document window, the interface configured to concurrently display the idea map window and the word processor document window and to automatically update the word processing document window with information from any changes in the idea map window, including automatically updating the text and image in the word processing window live, in real time, as the corresponding graphical nodes in the idea map window are being manipulated by the user.

7. A tangible machine-readable medium including instructions performable for:
providing a graphical user interface (GUI) including an idea map window for displaying and editing a graphical representation of a hierarchical network of graphical nodes, the nodes graphically representing ideas, and graphical links between ones of the nodes, the links graphically representing relationships between the ideas, a particular node being capable of being associated with corresponding text and an associated image; and
providing a word processor document window for displaying textual information, associated with respective nodes of the hierarchical network, in a word processor document, wherein an image associated with the particular node is displayed in the word processor window together with text associated with the particular node;
automatically organizing the displayed textual information for the user into a textual sequence displayed in the word processor document window; obtaining the textual sequence by automatically hierarchically processing the graphical representation of the hierarchical network of graphical nodes displayed in the idea map window, including, beginning with a graphically displayed root node, automatically hierarchically processing for a particular graphically displayed node any graphically displayed linked children nodes according to an ordering convention that uses only one of a clockwise manner or an anticlockwise manner as the linked children nodes are graphically displayed about their respective graphically displayed parent nodes in the hierarchical network of graphical nodes displayed in the idea map window, then proceeding to similarly automatically hierarchically process any linked children nodes according to the same ordering convention;

concurrently displaying the idea map window and the word processor document window; and automatically updating the word processing document window with information from any changes in the idea map window, including automatically updating the text and image in the word processing window live, in real time, as the corresponding graphical nodes in the idea map window are being manipulated by the user.

8. The machine-assisted method of claim 1, the method comprising:

displaying a two-dimensional (2D) graphical representation of a chart comprising the graphical representation of a hierarchical network of graphical nodes on a 2D display comprising the idea map window;

rotating the 2D graphical representation of the chart about at least one axis to obtain a virtual three-dimensional (3D) graphical representation of the chart;

displaying the virtual 3D graphical representation of the chart on the 2D display; and permitting a user to further rotate the virtual 3D graphical representation of the chart about a vertical axis in the virtual 3D graphical representation of the chart, the vertical axis extending vertically through a specified node in the virtual 3D graphical representation of the chart.

9. The method of claim 8, in which the rotating includes rotating around a horizontal axis through a root node of the hierarchical network.

10. The method of claim 9, in which the further rotating further includes rotating around a vertical axis through the root node of the hierarchical network.

11. The method of claim 8, in which the chart includes a flow chart.

12. The method of claim 11, in which the displaying the virtual 3D graphical representation of the chart includes displaying a perspective indication, and in which the perspective indication is visually indicative of a spatial relationship between the 3D graphical representation of the chart and the 2D graphical representation of the chart.

13. The method of claim 12, in which the perspective indication includes a grid.

14. The method of claim 13, further including displaying the perspective indication with the 2D graphical representation of the chart, and in which the perspective indication includes a grid with right angles between intersecting gridlines when displayed with the 2D graphical representation of the chart, and in which the perspective indication includes a grid with at least one non-right angle between intersecting gridlines when displayed with the 3D graphical representation of the chart.

15. The method of claim 8, in which the displaying the 2D graphical representation of a chart on the 2D display includes displaying a grid, and in which the displaying the 3D graphical representation of the chart includes modifying the grid to be indicative of a viewing perspective.

16. The computerized system of claim 6, wherein:

the GUI includes a two-dimensional (2D) display comprising the idea map window configured to display a 2D graphical representation of a chart comprising the graphical representation of a hierarchical network of graphical nodes and a virtual 3D graphical representation of the chart;

the GUI comprises a user input device configured to allow a user to specify a pivot node, in the hierarchical network of graphical nodes, about which a rotation is desired; and the system comprises a processor, the processor configured to use the user-specified pivot node to perform instructions to rotate the 2D graphical representation of the chart about at least one axis to obtain the virtual 3D graphical representation of the chart, the processor further configured to permit a user to further rotate the virtual 3D graphical representation of the chart about a vertical axis in the virtual 3D graphical representation of the chart, the vertical axis extending vertically through the user-specified pivot node in the virtual 3D graphical representation of the chart.

17. The system of claim 16, including a perspective indication displayed with the 2D graphical representation of the chart and the virtual 3D graphical representation of the chart, the perspective indication changing between the 2D graphical representation of the chart and the virtual 3D graphical representation of the chart to provide a visual perspective indicative of a spatial relationship between the 2D graphical representation of the chart and the virtual 3D graphical representation of the chart.

18. The system of claim 17, in which the perspective indication includes a grid.

19. The tangible machine-readable medium of claim 7, including instructions performable for:

displaying a two-dimensional (2D) graphical representation of a chart comprising the graphical representation of the hierarchical network of graphical nodes on a 2D display comprising the idea map window;

receiving from a user a user-specified pivot node, in the hierarchical network of graphical nodes, about which a rotation is desired;

rotating the 2D graphical representation of the chart about at least one axis to obtain a virtual three-dimensional (3D) graphical representation of the chart;

displaying the virtual 3D graphical representation of the chart on the 2D display; and permitting a user to further rotate the virtual 3D graphical representation of the chart about a vertical axis in the virtual 3D graphical representation of the chart, the vertical axis extending vertically through the user-specified pivot node in the virtual 3D graphical representation of the chart.

20. The machine-assisted method of claim 1, comprising:

automatically arranging the graphical representation of the hierarchical network of graphical nodes for display in the idea map window, in which the automatically arranging comprises iteratively:

determining, for each node, a first coordinate distance to each directly connected node;

determining, for each node, a second coordinate distance to each node that is not directly connected; and determining, using the first and second coordinate distances determined for each node in the hierarchical network of nodes, new positions for the nodes in relation to other nodes in the hierarchical network of nodes; and displaying the automatically arranged graphical representation of the hierarchical network on a computer display comprising the idea map window.

21. The method of claim 20, in which the determining the new positions for the nodes includes calculating, for each node i, a two-dimensional vector $(X_i, Y_i)$ as $$X_i = r \sum_j \frac{x_{ij}}{(x_{ij}^2 + y_{ij}^2)^R} - a \sum_k \frac{x_{ij}}{[D - (x_{ik}^2 + y_{ik}^2)]^A}$$

$$Y_i = r \sum_j \frac{y_{ij}}{(x_{ij}^2 + y_{ij}^2)^R} - a \sum_k \frac{y_{ij}}{[D - (x_{ik}^2 + y_{ik}^2)]^A}$$

wherein R, A, r, a, and D are specified constants, and adding $(X_i, Y_i)$ to the previous position of the node i to obtain a new position of the node i.

22. The method of claim 20, in which the displaying the automatically arranged graphical representation of the hierarchical network on the computer display includes displaying the graphical representation of the hierarchical network in a form that radiates star-like outward surrounding a root node.

23. The method of claim 20, in which the displaying the automatically arranged graphical representation of the hierarchical network on the computer display includes displaying the graphical representation of the hierarchical network in a form that extends root-like or branch-like from a root node.

24. The tangible machine-readable medium of claim 7 including instructions for performing a method comprising:
automatically arranging the graphical representation of the hierarchical network of graphical nodes for display in the idea map window, in which the automatically arranging comprises:
determining, for each node, a first coordinate distance to each directly connected node;
determining, for each node, a second coordinate distance to each node that is not directly connected; and
determining, using the first and second coordinate distances determined for each node in the hierarchical network of nodes, new positions for the nodes in relation to other nodes in the hierarchical network of nodes; and displaying the automatically arranged graphical representation of the hierarchical network on a computer display comprising the idea map window.

25. The computerized system of claim 6, comprising:
a processor configured to automatically arrange the graphical representation of the hierarchical network of graphical nodes for display in the idea map window by:
determining, for each node, a first coordinate distance to each directly connected node;
determining, for each node, a second coordinate distance to each node that is not directly connected; and
determining, using the first and second coordinate distances determined for each node in the hierarchical network of nodes, new positions for the nodes in relation to other nodes in the hierarchical network of nodes.

26. The method of claim 1, further comprising automatically scrolling to a corresponding portion of the displayed word processor document live, in real time, when a corresponding node in the displayed idea map is selected by the user.

27. The system of claim 6, in which the GUI is configured to scroll to a corresponding portion of the displayed word processor document when a corresponding node in the displayed idea map is selected by the user.

* * * * *